(12) United States Patent
Rangwala et al.

(10) Patent No.: US 12,657,083 B2
(45) Date of Patent: Jun. 16, 2026

(54) METHOD AND SYSTEM FOR FORECASTING TECHNOLOGY-RELATED FAILURES

(71) Applicant: JPMorgan Chase Bank, N.A., New York, NY (US)

(72) Inventors: Huzefa Rangwala, Mumbai (IN); Aman Pratap Singh, Thane (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 73 days.

(21) Appl. No.: 18/197,368

(22) Filed: May 15, 2023

(65) Prior Publication Data

US 2024/0330097 A1 Oct. 3, 2024

(30) Foreign Application Priority Data

Mar. 30, 2023 (IN) .............................. 202311023914

(51) Int. Cl.
*G06F 11/00* (2006.01)
*G06F 11/07* (2006.01)

(52) U.S. Cl.
CPC ........ *G06F 11/079* (2013.01); *G06F 11/0793* (2013.01)

(58) Field of Classification Search
CPC . G06F 11/079; G06F 11/0793; G06F 11/2263
See application file for complete search history.

(56) References Cited

U.S. PATENT DOCUMENTS

| | | | | |
|---|---|---|---|---|
| 10,860,451 B1 * | 12/2020 | Murthy | ................... | G06F 17/40 |
| 2015/0254125 A1 * | 9/2015 | Kakui | ................... | G06F 11/008 |
| | | | | 714/47.3 |
| 2016/0155315 A1 * | 6/2016 | McElhinney | ........ | G05B 23/024 |
| | | | | 340/502 |
| 2018/0113773 A1 * | 4/2018 | Krishnan | ............... | G06N 5/022 |
| 2018/0174069 A1 * | 6/2018 | Childress | ............... | G06N 20/00 |
| 2018/0267886 A1 * | 9/2018 | Durga | ................... | G06N 20/10 |
| 2019/0004891 A1 * | 1/2019 | Bi | ........................ | G06F 11/0793 |
| 2020/0019893 A1 * | 1/2020 | Lu | ........................ | G06N 5/025 |
| 2021/0342649 A1 * | 11/2021 | Doda | ..................... | G06N 3/044 |
| 2021/0406106 A1 * | 12/2021 | Moss | .................. | G06F 11/0706 |
| 2022/0019496 A1 * | 1/2022 | Lozano | ............... | G06F 11/0778 |
| 2022/0091915 A1 * | 3/2022 | Perneti | ................. | G06F 3/0653 |
| 2022/0398239 A1 * | 12/2022 | Mehta | ................. | G06F 11/0793 |
| 2023/0023646 A1 * | 1/2023 | Xu | ....................... | G06F 11/3006 |
| 2023/0125932 A1 * | 4/2023 | Ni | ........................ | G06F 11/079 |
| | | | | 714/37 |

\* cited by examiner

*Primary Examiner* — Philip Guyton
(74) *Attorney, Agent, or Firm* — GREENBLUM & BERNSTEIN, P.L.C.

(57) ABSTRACT

A method and a system for forecasting technology-related incidents and/or failures using artificial intelligence models and machine learning techniques are provided. The method includes: receiving a data set that relates to a system; analyzing the data set to identify a potential problem with respect to the system; and generating a report that includes a forecast that relates to the identified potential problem. The analysis is performed by applying an artificial intelligence (AI) algorithm that is trained by using historical data that relates to incidents and failures associated with the system.

16 Claims, 4 Drawing Sheets

400

Receive Data Set re System

S402

Analyze Data Set by Applying Artificial Intelligence
Algorithm

S404

Identify Potential System Problem

S406

Generate Report with Forecast

S408

Display Dashboard via User Interface

S410

METHOD AND SYSTEM FOR FORECASTING TECHNOLOGY-RELATED FAILURES

CROSS-REFERENCE TO RELATED APPLICATIONS

This application claims priority benefit from Indian Application No. 202311023914, filed on Mar. 30, 2023 in the India Patent Office, which is hereby incorporated by reference in its entirety.

BACKGROUND

1. Field of the Disclosure

This technology generally relates to methods and systems for identifying technological problems that are likely to occur in the future, and more particularly to methods and systems for forecasting technology-related incidents and/or failures using artificial intelligence models and machine learning techniques.

2. Background Information

In a vast infrastructure environment, there are various types of technology related failures which may be encountered due to multiple underlying reasons. All of these failures render huge impacts to businesses and their clients. Although there are historical reports that document past failures, there is a lack of any futuristic view of what lies ahead in an upcoming week or month. Due to the lack of such insights, it is difficult or impossible to identify how and where to focus and streamline systems so as to minimize the impacts of these failures.

Accordingly, there is a need for a method for forecasting technology-related incidents and/or failures.

SUMMARY

The present disclosure, through one or more of its various aspects, embodiments, and/or specific features or sub-components, provides, inter alia, various systems, servers, devices, methods, media, programs, and platforms for forecasting technology-related incidents and/or failures using artificial intelligence models and machine learning techniques.

According to an aspect of the present disclosure, a method for forecasting a technology-related failure is provided. The method is implemented by at least one processor. The method includes: receiving, by the at least one processor, a first data set that relates to a first system; analyzing, by the at least one processor, the first data set to identify a potential problem with respect to the first system; and generating, by the at least one processor based on a result of the analysis, a report that includes a forecast that relates to the identified potential problem.

The analyzing may include applying, to the first data, a first artificial intelligence (AI) algorithm that is trained by using historical data that relates to incidents and failures associated with the first system.

The AI algorithm may include a random-forest regressor algorithm.

The forecast may include at least one prediction of a failure to occur within a seven-day interval.

The forecast may include at least one prediction of a failure to occur within a thirty-day interval.

The report may include first information that relates to a cause of the identified potential problem and second information that relates to a reason for the failure.

The report may further include a recommendation for an action to be taken in order to mitigate the identified potential problem.

The method may further include displaying, via a user interface, a dashboard that includes the report and a first button that is usable for retrieving information that relates to an accuracy metric with respect to at least one historical forecast.

The dashboard may further include a second button that facilitates a user interaction with a chatbot with respect to the first system.

According to another exemplary embodiment, a computing apparatus for forecasting a technology-related failure is provided. The computing apparatus includes a processor; a memory; a display; and a communication interface coupled to each of the processor, the memory, and the display. The processor is configured to: receive, via the communication interface, a first data set that relates to a first system; analyze the first data set to identify a potential problem with respect to the first system; and generate, based on a result of the analysis, a report that includes a forecast that relates to the identified potential problem.

The processor may be further configured to perform the analysis by applying, to the first data, a first artificial intelligence (AI) algorithm that is trained by using historical data that relates to incidents and failures associated with the first system.

The AI algorithm may include a random-forest regressor algorithm.

The forecast may include at least one prediction of a failure to occur within a seven-day interval.

The forecast may include at least one prediction of a failure to occur within a thirty-day interval.

The report may include first information that relates to a cause of the identified potential problem and second information that relates to a reason for the failure.

The report may further include a recommendation for an action to be taken in order to mitigate the identified potential problem.

The processor may be further configured to cause the display to display, via a user interface, a dashboard that includes the report and a first button that is usable for retrieving information that relates to an accuracy metric with respect to at least one historical forecast.

The dashboard may further include a second button that facilitates a user interaction with a chatbot with respect to the first system.

According to yet another exemplary embodiment, a non-transitory computer readable storage medium storing instructions for forecasting a technology-related failure is provided. The storage medium includes executable code which, when executed by a processor, causes the processor to: receive a first data set that relates to a first system; analyze the first data set to identify a potential problem with respect to the first system; and generate, based on a result of the analysis, a report that includes a forecast that relates to the identified potential problem.

When executed by the processor, the executable code may further cause the processor to perform the analysis by applying, to the first data, a first artificial intelligence (AI) algorithm that is trained by using historical data that relates to incidents and failures associated with the first system.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
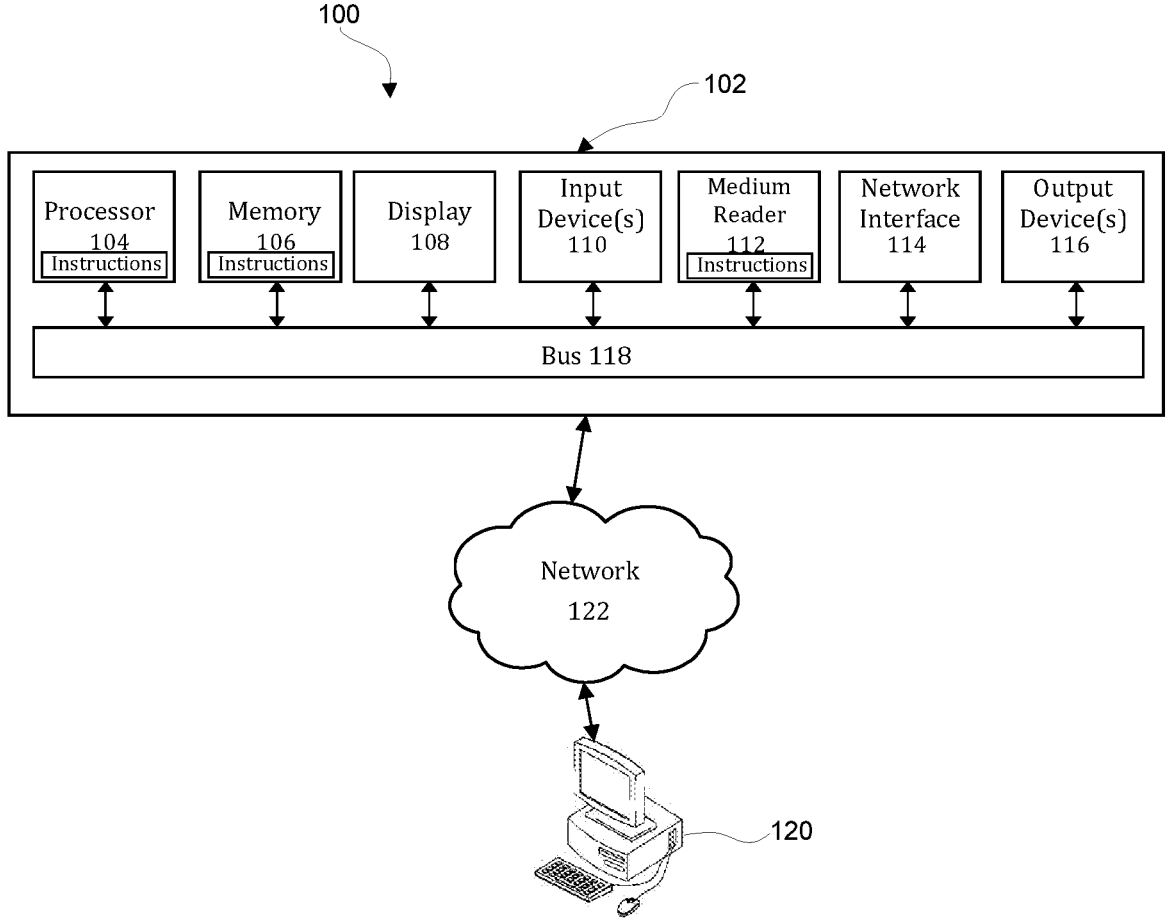
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for forecasting technology-related incidents and/or failures using artificial intelligence models and machine learning techniques.

Figure 2:
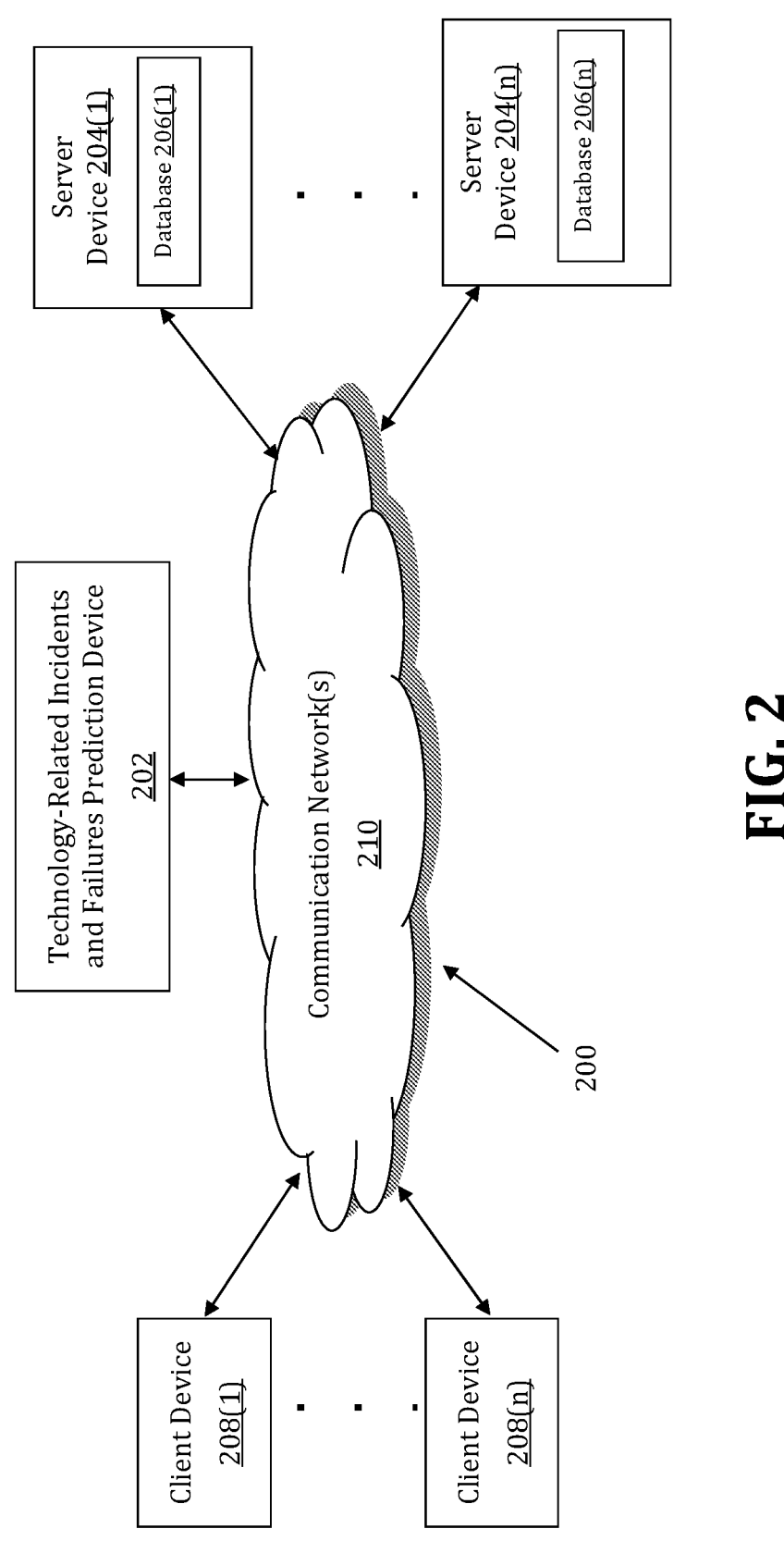
FIG. 2 illustrates an exemplary diagram of a network environment.

Referring to FIG. 2, a schematic of an exemplary network environment 200 for implementing a method for forecasting technology-related incidents and/or failures using artificial intelligence models and machine learning techniques is illustrated. In an exemplary embodiment, the method is executable on any networked computer platform, such as, for example, a personal computer (PC).

The method for forecasting technology-related incidents and/or failures using artificial intelligence models and machine learning techniques may be implemented by a Technology-related Incidents and Failures Prediction (TIFP) device 202. The TIFP device 202 may be the same or similar to the computer system 102 as described with respect to FIG. 1. The TIFP device 202 may store one or more applications that can include executable instructions that, when executed by the TIFP device 202, cause the TIFP device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the TIFP device 202 itself, may be located in virtual server(s) running in a cloud-based computing environment rather than being tied to one or more specific physical network computing devices. Also, the application(s) may be running in one or more virtual machines (VMs) executing on the TIFP device 202. Additionally, in one or more embodiments of this technology, virtual machine(s) running on the TIFP device 202 may be managed or supervised by a hypervisor.

In the network environment 200 of FIG. 2, the TIFP device 202 is coupled to a plurality of server devices 204(1)-204(n) that hosts a plurality of databases 206(1)-206 (n), and also to a plurality of client devices 208(1)-208(n) via communication network(s) 210. A communication interface of the TIFP device 202, such as the network interface 114 of the computer system 102 of FIG. 1, operatively couples and communicates between the TIFP device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the TIFP device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and TIFP devices that efficiently implement a method for forecasting technology-related incidents and/or failures using artificial intelligence models and machine learning techniques.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The TIFP device 202 may be a standalone device or integrated with one or more other devices or apparatuses, such as one or more of the server devices 204(1)-204(n), for example. In one particular example, the TIFP device 202 may include or be hosted by one of the server devices 204(1)-204(n), and other arrangements are also possible. Moreover, one or more of the devices of the TIFP device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204 (n) may include, among other features, one or more processors, a memory, and a communication interface, which are coupled together by a bus or other communication link, although other numbers and/or types of network devices may be used. The server devices 204(1)-204(n) in this example may process requests received from the TIFP device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206 (n) that are configured to store historical incident and failure reports and information that relates to accuracy metrics for forecasts of incidents and failures.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204 (1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208 (1)-208(n) in this example may include any type of computing device that can interact with the TIFP device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the TIFP device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the TIFP device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the TIFP device 202, the server devices 204(1)-204(n), or the client devices 208(1)-208(n), for example, may be configured to operate as virtual instances on the same physical machine. In other words, one or more of the TIFP device 202, the server devices 204(1)-

204(*n*), or the client devices 208(1)-208(*n*) may operate on the same physical device rather than as separate devices communicating through communication network(s) 210. Additionally, there may be more or fewer TIFP devices 202, server devices 204(1)-204(*n*), or client devices 208(1)-208 (*n*) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
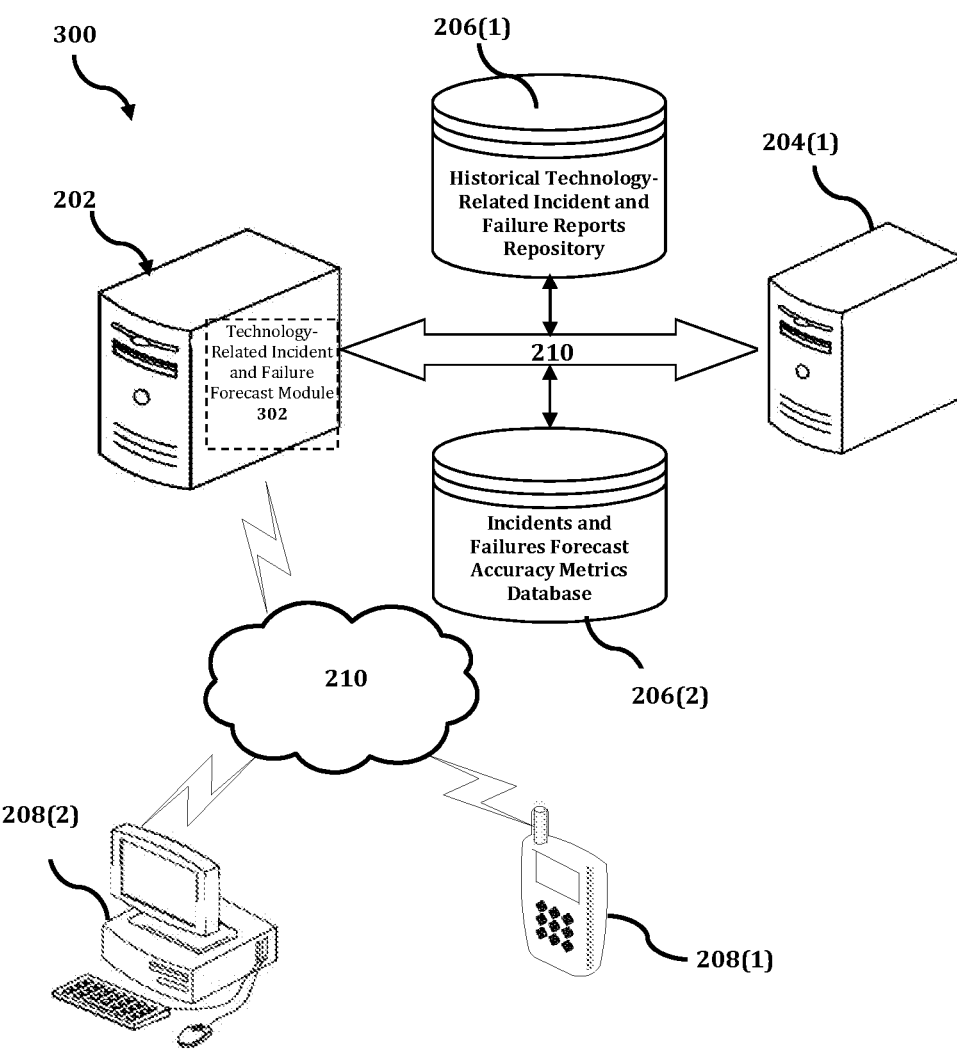
FIG. 3 shows an exemplary system for implementing a method for forecasting technology-related incidents and/or failures using artificial intelligence models and machine learning techniques.

The TIFP device 202 is described and illustrated in FIG. 3 as including a technology-related incident and failure forecast module 302, although it may include other rules, policies, modules, databases, or applications, for example. As will be described below, the technology-related incident and failure forecast module 302 is configured to implement a method for forecasting technology-related incidents and/or failures using artificial intelligence models and machine learning techniques.

An exemplary process 300 for implementing a mechanism for forecasting technology-related incidents and/or failures using artificial intelligence models and machine learning techniques by utilizing the network environment of FIG. 2 is illustrated as being executed in FIG. 3. Specifically, a first client device 208(1) and a second client device 208(2) are illustrated as being in communication with TIFP device 202. In this regard, the first client device 208(1) and the second client device 208(2) may be "clients" of the TIFP device 202 and are described herein as such. Nevertheless, it is to be known and understood that the first client device 208(1) and/or the second client device 208(2) need not necessarily be "clients" of the TIFP device 202, or any entity described in association therewith herein. Any additional or alternative relationship may exist between either or both of the first client device 208(1) and the second client device 208(2) and the TIFP device 202, or no relationship may exist.

Further, TIFP device 202 is illustrated as being able to access a historical technology-related incident and failure reports repository 206(1) and an incidents and failures forecast accuracy metrics database 206(2). The technology-related incident and failure forecast module 302 may be configured to access these databases for implementing a method for forecasting technology-related incidents and/or failures using artificial intelligence models and machine learning techniques.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the TIFP device 202 via broadband or cellular communication. Of course, these embodiments are merely exemplary and are not limiting or exhaustive.

Upon being started, the technology-related incident and failure forecast module 302 executes a process for forecasting technology-related incidents and/or failures using artificial intelligence models and machine learning techniques. An exemplary process for forecasting technology-related incidents and/or failures using artificial intelligence models and machine learning techniques is generally indicated at flowchart 400 in FIG. 4.

Figure 4:
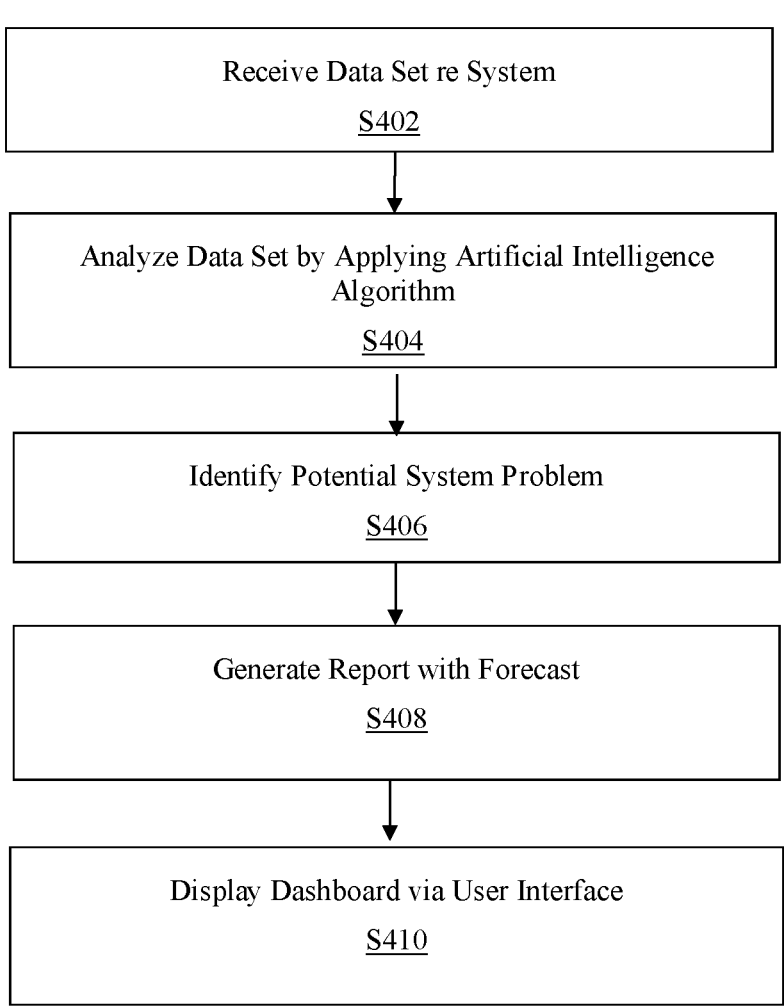
FIG. 4 is a flowchart of an exemplary process for implementing a method for forecasting technology-related incidents and/or failures using artificial intelligence models and machine learning techniques.

In process 400 of FIG. 4, at step S402, the technology-related incident and failure forecast module 302 receives a first data set that relates to a system. In an exemplary embodiment, the first set data set includes operational information that relates to a wide variety of applications and subsystems that run within the system, and more particularly to categories of incidents and failures within the system. For example, the first data set may include data that relates to incidents and failures that correspond to any one or more of the following categories: 1) application software; 2) access management; 3) assets and configurations; 4) batch processes; 5) business data quality; 6) capacity management; 7) change management; 8) design; 9) environmental; 10) external customer failures and errors; 11) hardware errors; 12) infrastructure; 13) maintenance; 14) performance; 15) software failures; 16) validation and testing; and 17) workspace.

At step S404, the technology-related incident and failure forecast module 302 analyzes the first data set. In an exemplary embodiment, the analysis is performed by applying an artificial intelligence (AI) algorithm to the first data set. The AI algorithm is trained by using historical data that relates to incidents and failures associated with the system. For example, the AI algorithm may include a random-forest regressor algorithm. Alternatively, the AI algorithm may include a different type of neural network algorithm.

At step S406, the technology-related incident and failure forecast module 302 uses a result of the analysis of the first data set to identify a potential problem with respect to the system. Then, at step S408, the technology-related incident and failure forecast module 302 generates a report that includes a forecast that relates to the identified problem. In an exemplary embodiment, the report may include at least one prediction of a failure to occur within a predetermined time frame, such as, for example, a seven-day interval or a thirty-day interval. The report may also include first information that relates to a cause of the potential problem and/or second information that relates to a reason for the predicted failure. The report may further include a recommendation for an action to be taken in order to mitigate the potential problem.

At step S410, the technology-related incident and failure forecast module 302 displays a dashboard via a user interface. In an exemplary embodiment, the dashboard is designed to facilitate user interaction with respect to the identified potential problem and the predicted failure. For example, the dashboard may include the report generated in step S408, or the dashboard may provide a button and/or a link that is clickable by a user in order to access the report. The dashboard may also include a button and/or a link that is usable for retrieving information that relates to one or more accuracy metrics with respect to historical forecasts. The dashboard may also include a button and/or a link that activates a chatbot with which a user may interact in order to obtain additional information in relation to the identified potential problem.

In an exemplary embodiment, a model that is hosted by the technology-related incident and failure forecast module 302 operates on a supervised learning technique and provides a forecast of failures in technology that may have an adverse effect on business. The forecast may yield an opportunity to lessen the adverse effects involved with such technology failures.

In an exemplary embodiment, the method for forecasting technology-related incidents and/or failures using artificial intelligence models and machine learning techniques is a technology agnostic solution.

In an exemplary embodiment, the solution is integrated with chatbots, thereby making the system user interactive with an ability to make prediction at a single seal and/or multiple seal (i.e., application) level based on user demand.

In an exemplary embodiment, time series data is obtained over time for a same variable and ingested into the model and measured at a periodic or regular time intervals. For example, the model may use a first interval of 7 days and/or a second interval of 30 days to forecast incidents. The data used by the model originates from a common source observed across all lines of business in order to reference all relevant details.

In an exemplary embodiment, a data mining algorithm is based on a Knowledge Discovery in Databases (KDD) process of data science in identifying valid and understandable patterns on complicated and unstructured data sets to order to discover previously unknown patterns.

In an exemplary embodiment, an end user may be a senior representative or production or application owner who would require such information for analysis and prevention of future failures.

In an exemplary embodiment, the model predicts the number of failures in conjunction with the root cause category with the reasoning for failure. The failure reason may represents a solution category in the form of one or more tags (such as, for example, database, feed issue, etc.). Tags enable support and development teams to formulate workstreams as relevant to prevent the forecasted failures.

In an exemplary embodiment, in a first use case, time series predictions are generated. The model shows weekly and/or monthly time series predictions of any failures, together with a predicted root cause and a reason for each failure. The predictions may be displayed on a user interface based on user inputs and selections. The user interface also enables a user to retrieve archived data on demand and to perform accuracy checks on past predictions based on actual occurrences.

An application programming interface (API) endpoints use case represents a second use case. In an exemplary embodiment, all predictions are exposed via the API endpoints. Multiple URL endpoints are available for storing relevant outputs in order to enable exposure of predictions via the API endpoints to the outside world.

A third use case is represented by integration with chatbots. In an exemplary embodiment, the API endpoints may be exposed to chatbots for interactive output based on user demand, thereby facilitating access to predictions by relevant application teams. The chatbots can easily be onboarded to chat rooms, and users can then interact with them in order to obtain access to predictions being made by the model.

A fourth use case is represented by a tagging operation. In an exemplary embodiment, the model predicts a reason for each failure and provides a specific tag that corresponds to the root cause for each failure. The tags provide representations of solutions that may allow for a prevention of the failure before it occurs or recurs. The user interface provides a historical view of predictions with incident numbers, thereby facilitating easy reference to previous resolutions that have been employed with respect to past incidents.

A fifth use case is represented by a home page. In an exemplary embodiment, a home page may be labeled as referring to a "Seal & Categories Incidents Prediction" application. The home page may also provide a menu bar that enables a user to select various types of user interfaces, such as, for example, an application view that includes individual application incident forecasts and comparisons of past predictions with actual incidents that are usable for assessing model accuracy; an application operator manager view that includes a list of all applications and their weekly incident forecasts in a single window; and a major incidents view that includes major incidents and failures only.

A sixth use case is represented by the application view. In an exemplary embodiment, the application view provides a prompt for enabling a user to input identifying information, such as an identification number, and buttons that enable the user to access a weekly forecast, a monthly forecast, and information that relates to prediction accuracy that correspond to the inputted identification number.

A seventh use case is represented by a prediction results view that is accessible via the application view. In an exemplary embodiment, when a user inputs an identification number and then clicks on the weekly forecast button, the user interface may display a weekly forecast that includes a time frame for which the forecast is applicable and charts that indicate a root-cause category, a number of forecasted incidents, a number of incidents that had been predicted for the previous week, and a number of incidents that had actually occurred during the previous week. The user interface may also display, for a particular root-cause category, a number of predicted failures and recommended actions for counteracting or preventing the failures. For example, for a root-cause category "Code Defect" and a prediction of two (2) failures, the user interface may indicate recommended actions of "Review or check plan" and "Review or check Regression test" with respect to the predicted failures.

An eighth use case is represented by historical predictions for trend analysis and accuracy. In an exemplary embodiment, the user interface may enable a user to input a start date and an end date and then may display a prediction history for the inputted interval. The prediction history may be shown as a table that includes a first column for category of incidents and failures, a second column for a number of predicted incidents, and a third column for a number of actual incidents. The user interface may also display a graphical depiction of a comparison between predicted incidents and actual incidents, and color coding may be used to emphasize the comparison. In an exemplary embodiment, the categories of the incidents and failures may include the following: 1) application software; 2) access management; 3) assets and configurations; 4) batch processes; 5) business data quality; 6) capacity management; 7) change management; 8) design; 9) environmental; 10) external customer failures and errors; 11) hardware errors; 12) infrastructure; 13) maintenance; 14) performance; 15) software failures; 16) validation and testing; and 17) workspace.

A ninth use case is represented by a chat bot view. In an exemplary embodiment, the chat bot view enables a user to access all of the information described above by providing inputs that correspond to requests for information and receiving responses from the chat bot.

Accordingly, with this technology, an optimized process for forecasting technology-related incidents and/or failures using artificial intelligence models and machine learning techniques is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for forecasting a technology-related failure, the method being implemented by at least one processor, the method comprising:

receiving, by the at least one processor, a first data set that relates to a first system;

analyzing, by the at least one processor, the first data set to identify a potential problem with respect to the first system;

generating, by the at least one processor based on a result of the analysis, a report that includes a forecast that relates to the identified potential problem; and displaying, via a user interface, a dashboard that includes a first button that is clickable by a user for accessing the report, a second button that is usable for retrieving information that relates to an accuracy metric with respect to at least one historical forecast, and a third button that activates a chatbot with which the user interacts, wherein the information that relates to the accuracy metric includes a menu bar that facilitates a user selection from among an application view that includes individual application incident forecasts and comparisons of past predictions with actual incidents that are usable for assessing model accuracy, an application operator manager view that includes a list of all applications and corresponding weekly incident forecasts, and a major incidents view that includes major incidents and failures.

2. The method of claim 1, wherein the analyzing comprises applying, to the first data, a first artificial intelligence (AI) algorithm that is trained by using historical data that relates to incidents and failures associated with the first system.

3. The method of claim 2, wherein the AI algorithm includes a random-forest regressor algorithm.

4. The method of claim 1, wherein the forecast includes at least one prediction of a failure to occur within a seven-day interval.

5. The method of claim 1, wherein the forecast includes at least one prediction of a failure to occur within a thirty-day interval.

6. The method of claim 5, wherein the report includes first information that relates to a cause of the identified potential problem and second information that relates to a reason for the failure.

7. The method of claim 6, wherein the report further includes a recommendation for an action to be taken in order to prevent the identified potential problem before the identified potential problem occurs.

8. A computing apparatus for forecasting a technology-related failure, the computing apparatus comprising:
    a processor;
    a memory;
    a display; and
    a communication interface coupled to each of the processor, the memory, and the display,
    wherein the processor is configured to:
        receive, via the communication interface, a first data set that relates to a first system;
        analyze the first data set to identify a potential problem with respect to the first system;
        generate, based on a result of the analysis, a report that includes a forecast that relates to the identified potential problem; and
        cause the display to display, via a user interface, a dashboard that includes a first button that is clickable by a user for accessing the report, a second button that is usable for retrieving information that relates to an accuracy metric with respect to at least one historical forecast, and a third button that activates a chatbot with which the user interacts,
    wherein the information that relates to the accuracy metric includes a menu bar that facilitates a user selection from among an application view that includes individual application incident forecasts and comparisons of past predictions with actual incidents that are usable for assessing model accuracy, an application operator manager view that includes a list of all applications and corresponding weekly incident forecasts, and a major incidents view that includes major incidents and failures.

9. The computing apparatus of claim 8, wherein the processor is further configured to perform the analysis by applying, to the first data, a first artificial intelligence (AI) algorithm that is trained by using historical data that relates to incidents and failures associated with the first system.

10. The computing apparatus of claim 9, wherein the AI algorithm includes a random-forest regressor algorithm.

11. The computing apparatus of claim 8, wherein the forecast includes at least one prediction of a failure to occur within a seven-day interval.

12. The computing apparatus of claim 8, wherein the forecast includes at least one prediction of a failure to occur within a thirty-day interval.

13. The computing apparatus of claim 12, wherein the report includes first information that relates to a cause of the identified potential problem and second information that relates to a reason for the failure.

14. The computing apparatus of claim 13, wherein the report further includes a recommendation for an action to be taken in order to prevent the identified potential problem before the identified potential problem occurs.

15. A non-transitory computer readable storage medium storing instructions for forecasting a technology-related failure, the storage medium comprising executable code which, when executed by a processor, causes the processor to:
    receive a first data set that relates to a first system;
    analyze the first data set to identify a potential problem with respect to the first system;
    generate, based on a result of the analysis, a report that includes a forecast that relates to the identified potential problem; and
    display, via a user interface, a dashboard that includes a first button that is clickable by a user for accessing the report, a second button that is usable for retrieving information that relates to an accuracy metric with respect to at least one historical forecast, and a third button that activates a chatbot with which the user interacts,
    wherein the information that relates to the accuracy metric includes a menu bar that facilitates a user selection from among an application view that includes individual application incident forecasts and comparisons of past predictions with actual incidents that are usable for assessing model accuracy, an application operator manager view that includes a list of all applications and corresponding weekly incident forecasts, and a major incidents view that includes major incidents and failures.

16. The storage medium of claim 15, wherein when executed by the processor, the executable code further causes the processor to perform the analysis by applying, to the first data, a first artificial intelligence (AI) algorithm that is trained by using historical data that relates to incidents and failures associated with the first system.

* * * * *